United States Patent
Liu et al.

(10) Patent No.: US 8,588,519 B2
(45) Date of Patent: Nov. 19, 2013

(54) METHOD AND SYSTEM FOR TRAINING A LANDMARK DETECTOR USING MULTIPLE INSTANCE LEARNING

(75) Inventors: David Liu, Princeton, NJ (US); Shaohua Kevin Zhou, Plainsboro, NJ (US); Paul Swoboda, Deutschland (DE); Dorin Comaniciu, Princeton Junction, NJ (US); Christian Tietjen, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 13/228,509

(22) Filed: Sep. 9, 2011

(65) Prior Publication Data

US 2012/0070074 A1      Mar. 22, 2012

Related U.S. Application Data

(60) Provisional application No. 61/385,226, filed on Sep. 22, 2010, provisional application No. 61/486,520, filed on May 16, 2011.

(51) Int. Cl.
*G06K 9/52*      (2006.01)

(52) U.S. Cl.
USPC .......................................................... 382/159

(58) Field of Classification Search
None
See application file for complete search history.

(56) References Cited

U.S. PATENT DOCUMENTS

| | | | |
|---|---|---|---|
| 7,822,252 B2 | 10/2010 | Bi et al. | |
| 7,986,827 B2 | 7/2011 | Rao et al. | |
| 8,010,471 B2 | 8/2011 | Zhang et al. | |
| 2005/0111751 A1* | 5/2005 | Avinash | 382/275 |
| 2009/0018985 A1* | 1/2009 | Zhang et al. | 706/20 |
| 2009/0080731 A1 | 3/2009 | Krishnapuram et al. | |
| 2009/0290802 A1 | 11/2009 | Hua et al. | |
| 2009/0310854 A1 | 12/2009 | Mei et al. | |
| 2011/0119210 A1 | 5/2011 | Zhang et al. | |

OTHER PUBLICATIONS

X. Liu, and T. Yu, "Gradient Feature Selection for Online Boosting," Proc. IEEE Int'l J. Computer Vision, pp. 1-8, 2007.*
Sun et al., 2006 Y. Sun, S. Todorovic, L. Li, "Reducing the overfitting of adaboost by controlling its data distribution skewness," International Journal of Pattern Recognition and Artificial Intelligence, 20 (7) (2006), pp. 1093-1116.*
Viola et al, "Multiple Instance Boosting for Object Detection", NIPS 2005, 19th Annual Conference on Neural Information Processing Systems, Vancouver, CA, Dec. 5, 2005, pp. 1417-1424.

(Continued)

*Primary Examiner* — Nirav G Patel

(57) ABSTRACT

An apparatus and method for training a landmark detector receives training data which includes a plurality of positive training bags, each including a plurality of positively annotated instances, and a plurality of negative training bags, each including at least one negatively annotated instance. Classification function is initialized by training a first weak classifier based on the positive training bags and the negative training bags. All training instances are evaluated using the classification function. For each of a plurality of remaining classifiers, a cost value gradient is calculated based on spatial context information of each instance in each positive bag evaluated by the classification function. A gradient value associated with each of the remaining weak classifiers is calculated based on the cost value gradients, and a weak classifier is selected which has a lowest associated gradient value and given a weighting parameter and added to the classification function.

36 Claims, 12 Drawing Sheets

(56) References Cited

OTHER PUBLICATIONS

Xiang et al, "Boosting With Spatial Regularization", Jan. 1, 2009, retrieved from the internet: http://www.zhenfavor.org/home/Xiang2009Boosting.pdf.

Avidan et al., "Spatial Boost: Adding Spatial Reasoning to AdaBoost", Jan. 1, 2006, Computer Vision—ICCV 2006 Lecture Notes in Computer Science, pp. 386-396.

European Search Report dated Jan. 30, 2013.

* cited by examiner

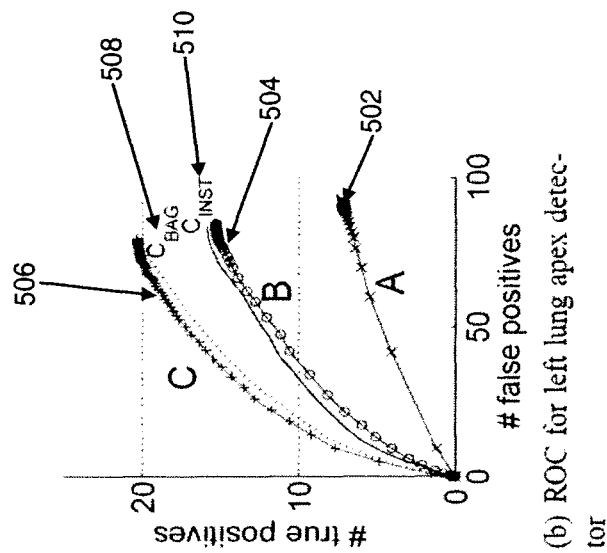
Fig. 5b (b) ROC for left lung apex detector
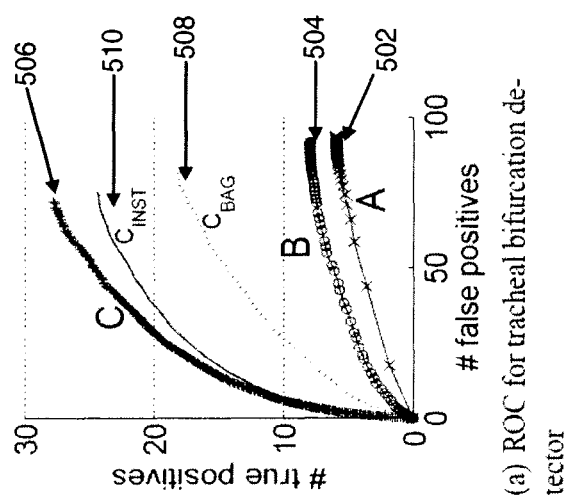
Fig. 5a (a) ROC for tracheal bifurcation detector

METHOD AND SYSTEM FOR TRAINING A LANDMARK DETECTOR USING MULTIPLE INSTANCE LEARNING This application claims the benefit of U.S. Provisional Application No. 61/385,226, filed Sep. 22, 2010, and U.S. Provisional Application No. 61/486,520, filed May 16, 2011, the entire disclosures of which are herein incorporated by reference.

BACKGROUND OF THE INVENTION

The present invention relates to training a landmark detector using training data with noisy annotations.

In object detection, such as landmark detection, one of the biggest obstacles is obtaining accurate annotations. A landmark is defined as a distinct and unique anatomical structure useful for other tasks, such as image registration. Some anatomical structures that constitute landmarks include the lung apex, liver top, and tracheal bifurcation. Obtaining annotations can often be a very tedious and/or error prone task. Typically, to facilitate accurate landmark detection, a large amount of accurately annotated training data is needed. Training of landmark detectors is important in accurately finding the positions of anatomical landmarks in medical images and medical volumes.

To properly train a landmark detector to accurately detect landmarks, accurate annotations of landmark locations within training data is necessary. For example, a domain expert may provide accurate annotations by accurately indicating ground truth positions within training data images and volumes. On the other hand, novice annotators may provide noisy annotations that may be within a tolerable distance from ground truth positions. Thus, during training of landmark detectors using a mixture of annotated training data from both experts and novice annotators, there may be a mixture of both accurate annotations providing positive training samples, and noisy annotations that only provide a rough indication of where the positive training samples are actually located.

BRIEF SUMMARY OF THE INVENTION

Multiple Instance Learning (MIL) is a learning framework that is better equipped to handle noisy annotations in comparison with standard supervised learning methods. However, to train a classifier to accurately and efficiently detect an object or landmark using MIL, the present invention has recognized that a large amount of training data is still necessary and a large amount of inaccurate annotations may still result in high error rates. Additionally, if the training data images themselves are not of optimal quality, such as when an image is blurry, the true object position may still be difficult to detect.

In an embodiment of the present invention, a landmark detector may be trained using multiple instance learning. Training data including a plurality of training bags is received. The plurality of training bags include a plurality of positive training bags, each including a plurality of positively annotated instances, and a plurality of negative training bags, each including at least one negatively annotated instance. Classification function is initialized by training a first weak classifier based on the positive training bags and the negative training bags. All training instances are evaluated using the classification function. For each of a plurality of remaining classifiers, a cost value gradient is calculated based on spatial context information of each instance in each positive bag evaluated by the classification function. A gradient value associated with each of the remaining weak classifiers is calculated based on the cost value gradients. A weak classifier of the plurality of remaining weak classifiers is selected. The selected weak classifier has a lowest associated gradient value. A weighting parameter associated with the selected weak classifier is determined. The selected weak classifier is added to the classification function.

In an embodiment, calculating the cost value gradient is based on spatial context information. The spatial context information may be at a training bag level, the spatial context information calculated by determining a spread of each training bag. The spread of each bag may be determined by normalizing a score of each training back against a number of instances in the respective training bag. The spatial context information may also be at an instance level and calculated using a rank conditioned rank selection filter. The spatial context information at the training bag level and at the instance level may be combined.

In an embodiment, the cost value gradient is calculated by calculating a data term and a spatial regularization term and using both to arrive at the cost value gradient. The data term is calculated using a smoothed max function. The spatial regularization term is calculated by calculating a total variation regularization value for each training bag.

In an embodiment, a pruning operation is performed after adding each selected weak classifier to the classification function.

These and other advantages of the invention will be apparent to those of ordinary skill in the art by reference to the following detailed description and the accompanying drawings.

BRIEF DESCRIPTION OF THE DRAWINGS

FIG. 5 illustrates try positive versus false positive ratios from experiments conducted using the present invention;

DETAILED DESCRIPTION

The present invention provides a method and system for training a landmark detector using multiple instance learning in order to accurately detect landmarks in medical images and volumes, such as 2D fluoroscopic images and 3D computerized tomography (CT) volumes. In medical images, landmarks are typically located spatially apart from each other and that a response from a landmark detector should be clustered in space. Thus, the present invention uses the spatial structure of instances in training data to solve the aforementioned problem of training detectors using training data including noisy annotations.

Embodiments of the present invention are described herein to give an understanding of the method of training a landmark detector using multiple instance learning while incorporating spatial context information. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
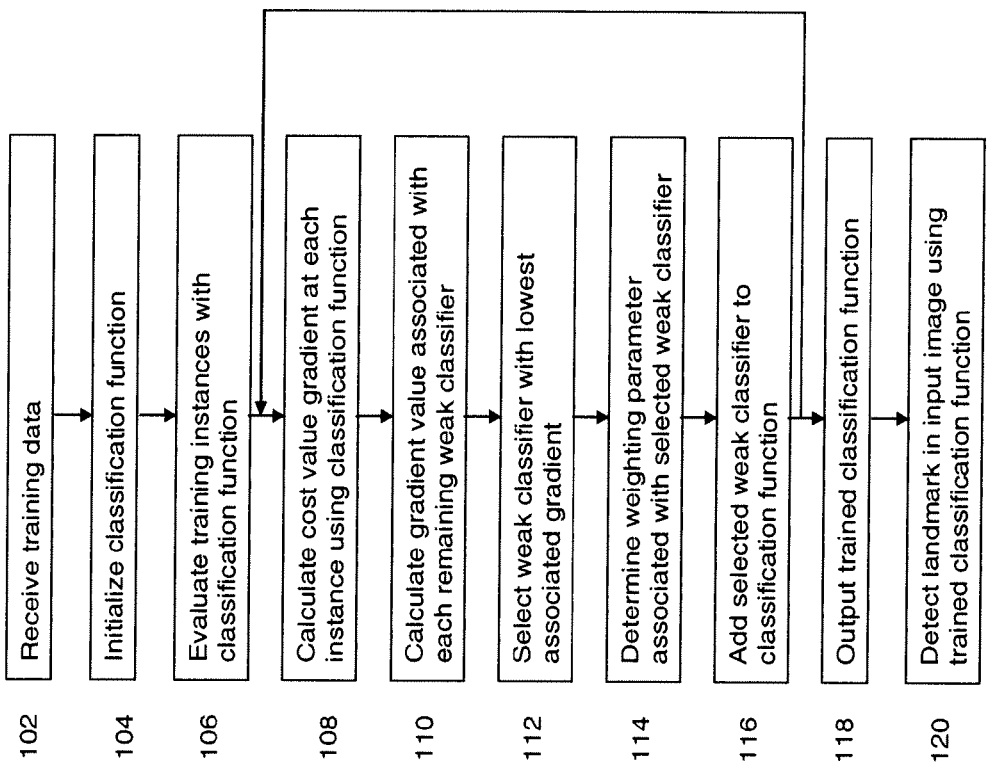
FIG. 1 illustrates a method for training a landmark detector according to an embodiment of the present invention.

FIG. 1 illustrates a method for training a landmark detector according to an embodiment of the present invention. At step 102, a plurality of annotated training data is received. The plurality of annotated training data includes a plurality of positive bags including a plurality of positively annotated instances, and a plurality of negative bags including at least one negatively annotated instance. In supervised learning, training data is provided in the form of $\{x_i, l_i\}$, where $x_i \in R^d$ is a feature vector of each instance (representing an annotation) and $l_i$ the binary label, indicating positive ($l_i=1$) or negative ($l_i=0$). In multiple instance learning, the training data is provided in bags, where each bag i has $n_i$ instances $$\{x_i^1, \ldots, x_i^{n_i}\}.$$

Each positive bag contains $n_i \geq 1$ instances. Although all of the instances in a positive bag are initially annotated as positive, one instance is actually positive and the remaining instances (i.e., pixels or voxels) are actually negative. It is unknown which instance is positive. Each negative bag contains only one negative instance.

Figure 2B:
FIG. 2 shows annotated training images used for training a landmark detector in accordance with an embodiment of the present invention.
Figure 2D:
Figure 2A:
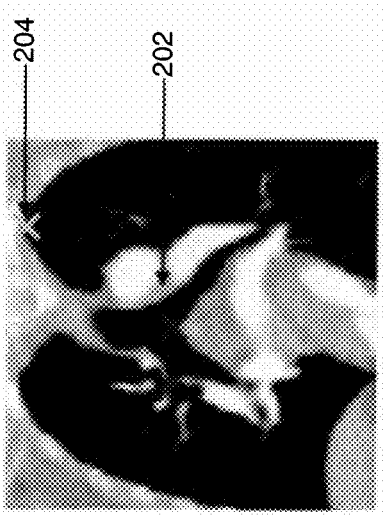
Figure 2C:
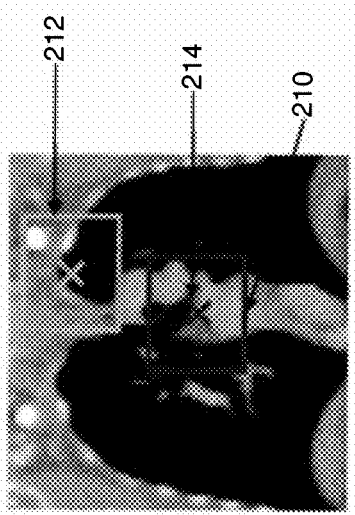

For example, FIGS. 2a-2d each show an annotated training image. FIGS. 2a and 2b show positive annotations 202 and 206 and negative annotations 204 and 208. Annotations 202 and 206 represent annotations of a tracheal bifurcation. Annotations 204 and 208 represent annotations of a left lung apex. The annotations 202, 204, 206, and 208 are clean annotations that are positive and accurately annotated by an expert. FIGS. 2c and 2d show boxes 210 and 216, each representing a positive training bag and boxes 212 and 218, each representing a negative training bag. For example, all of the voxels within box 210 form a positive bag since at least one of the instances is a positive instance, represented by annotation 202. All remaining voxels in the training image are actually negative instances.

The object of training the plurality of annotated training data including the plurality of positive bags and the plurality of negative bags is to learn a landmark classifier $H(x_i)$ or classification function, which can assign a label (i.e., positive or negative) to each pixel or voxel in an image or volume.

This instance classifier or classification function assigns a score to each training instance in each training bag. The score is represented by:

$$y_{ij} \equiv H(x_{ij}) = \sum_{t=1}^{T} \lambda_t h_t(x_{ij}) \qquad \text{(Eq. 1)}$$

where i indexes each training bag, and j indexes each instance within each training bag. $h_t$ represents each base classifier or weak classifier, $\lambda_t$ denotes the coefficients or weighting parameter associated with each weak classifier, and T represents the number of weak classifiers.

The score of each training instance $y_{ij}$ may be converted to an instance probability $p_{ij}$ (which denotes the probability that the instance is positive) by using the logistic sigmoid function to arrive at:

$$p_{ij} = \frac{1}{1 + \exp(-y_{ij})} \qquad \text{(Eq. 2)}$$

The probability that an individual training bag is positive is represented by:

$$p_i = 1 - \prod_j (1 - p_{ij})^{\frac{1}{n_i}} \qquad \text{(Eq. 3)}$$

Thus, a likelihood indicating the probability that a given training bag is positive is represented by:

$$L(H) = \prod_i p_i^{l_i} (1 - p_i)^{(1-l_i)} \qquad \text{(Eq. 4)}$$

where $l_i \in \{0,1\}$ represents the label of each training bag i.

In order for the instance classifier to maximize the likelihood presented above, a series of boosting searches is performed for each weak classifier $h_t \in \{-1,+1\}$ (binary classifier) in order to maximize $$\sum_i \sum_j h_t(x_{ij}) w_{ij},$$

where the weight $w_{ij}$ of each instance is given by the derivative of L with respect to a change in $y_{ij}$, which is represented by:

$$w_{ij} \equiv \frac{\partial \log L(H)}{\partial y_{ij}} = \frac{l_i - p_i}{p_i} p_{ij} \quad \text{(Eq. 5)}$$

The weak classifier combination coefficient, or weighting parameter $\lambda_t$ is determined using a line search in order to maximize log $L(H+\lambda_t h_t)$.

A plurality of weak classifiers, where T represents the total number of base classifiers, must be trained.

Returning to FIG. 1, at step 104, a classification function is initialized by training a first weak classifier based on the positive training bags and the negative training bags. The classification trains the first weak classifier by assigning a score to each of the training bags, which yields a probability representing whether or not a particular training bag is positive.

At step 106, all training instances are evaluated using the classification function. At this point, the classification function includes the first weak classifier and all of the training instances are evaluated based on the trained first weak classifier.

If there is more than one base classifier, or weak classifier to train, and so long as there remain weak classifiers to train, the method proceeds to step 108 to train each of the weak classifiers iteratively. For each of a plurality of remaining weak classifiers, each weak classifier will be trained by taking into account spatial context information of the training bags and the instances in each of the training bags. The implementation of spatial context information is discussed in greater detail below. After training of the first weak classifier in accordance with the steps set forth above, each of the remaining weak classifiers is trained.

At step 108, a cost value gradient is calculated for each instance in each positive training bag evaluated by the classification function based on spatial context information. The cost value gradient may be represented by Eq. 5 shown above. The cost value gradient may take into account spatial context information at the bag level, at the instance level, or at both the bag level and the instance level. The spatial context information is incorporated into the computation of weights discussed above. A detailed discussion of incorporating spatial context information is presented below.

At step 110, a gradient value associated with each weak classifier is calculated based on the cost value gradients. These gradient values are used to determine which weak classifier will be the next one to be added to the classification function.

At step 112, a weak classifier having a lowest associated gradient value of the plurality of remaining weak classifiers is selected. Selection of this weak classifier is also based upon the spatial context information incorporated into the cost value gradients, which are the basis of calculating the gradient values. A detailed discussion of how the spatial context information is determined is discussed below.

Assuming that the score of each training bag i is denoted as $s_i$, and the score of each instance in a training bag i as $s_{ij}$. Scores are related to the instance probabilities discussed above, in the following manner:

$$s_i = \log \frac{1}{1-p_i} \text{ and } s_{ij} = \log \frac{1}{1-p_{ij}} \quad \text{(Eq. 6)}$$

When any given weak classifier has low accuracy, highly-scored instances tend to be scattered around in space, and deviate from an assumption that there is only one 'bump' or true positive instance within a score map for the classifier. In order to capture the notion of scatterness, a spread of each training bag can be defined as follows:

$$d_i = \frac{1}{n_i(n_{i-1})} \sum_j \sum_k \|r_{ij} - r_{ik}\|_1 p_{ij} p_{ik} \quad \text{(Eq. 7)}$$

where $r_{ij}$ represents the position of instance j within bag i. The higher $d_i$ is, the higher the degree of scatter for instances within a particular training bag. Conversely, the lower $d_i$ is, the lower the degree of scatter.

Assuming that the training bag and instance scores follow the sum rule, the score of each training bag can be represented by:

$$s_i = \frac{1}{d_i n_i} \sum_j s_{ij} = q_i \sum_j s_{ij} \quad \text{(Eq. 8)}$$

The factor $n_i$, representing the number of instances in a training bag, is used in Eq. 7 in order to normalize the training bag score against the number of instances it contains. This ensures that training bags containing more instances do not automatically have a higher associated score. Given two training bags with the exact same sum of instance scores as given by Eq. 8, and assuming each training bag has the same number of instances, the training bag with a lower spread will have a higher score. Thus, the spatial relationship between instances within each training bag is taken into account.

Assuming that there is only one positive instance in each positive training bag, only the positive instance should receive a high score and all remaining instances should receive a low score. However, if noisy annotations are present in the training data, the identity of the positive instance is hidden, resulting in ambiguity during learning, which results in noisy score maps. Thus, spatial context information at an instance level may be incorporated into multiple instance learning to solve this problem.

In image processing, nonlinear filters are often used to remove noise and restore signals. Rank conditioned rank selection (RCRS) filters are particularly well known for signal restoration. In particular, a median filter can be used to sort neighboring voxels based on their scores and replace the original value of each voxel with a median value. Application of the median filter with respect to the embodiments described herein may be expressed as follows:

$$s'_{ij} = \sum_{k \in N_j} s_{ik} m_{ik} (\{s_{iu}\}_{u \in N_j}) \quad \text{(Eq. 9)}$$

where $N_j$ denotes the neighbors of instance j. In the case of a median filter, the value of $m_{ik}$ is one if $s_{ik}$ equals the median, and otherwise zero. Although Eq. 9 is expressed as a linear summation, the RCRS filter is nonlinear, because the coefficients $m_{ik}$ are dependent upon a sorted list of scores.

The aforementioned concepts of incorporating spatial context information at a training bag level and at an instance level may be combined and represented as follows:

$$s_i = q_i \sum_j s'_{ij} = q_i \sum_j \sum_{k \in N_j} s_{ik} m_{ik}(\{s_{iu}\}_{u \in N_j}) = q_i \sum_j s_{ij} q_{ij} \quad \text{(Eq. 10)}$$

where $q_u$ is a function over scores of instances within a spatial neighborhood, and $$q_i = \frac{1}{d_i n_i}$$

is a function over positions and scores of all instances in a given training bag i. Both functions $q_{ij}$ and $$q_i = \frac{1}{d_i n_i}$$

incorporate spatial clustering into multiple instance learning.

By using both Eq. 6 and Eq. 10, it can be shown that:

$$p_i = 1 - \pi_j (1 - p_{ij})^{q_i q_{ij}} \quad \text{(Eq. 11)}$$

and from Eq. 1, it can be shown that:

$$w_{ij} \equiv \frac{\partial \log L(H)}{\partial y_{ij}} = q_i q_{ij} \frac{l_i - p_i}{p_i} p_{ij} \quad \text{(Eq. 12)}$$

By incorporating spatial context information with multiple instance learning, the instance classifier is trained to identify positive bags with a lower spread. The computation of $q_i$ is efficient because pairwise distances are evaluated only over instances in positive bags and because median filtering is only performed in a small neighborhood.

At step 114, a weighting parameter associated with the selected weak classifier is determined. The weighing parameter is determined using a line search to achieve a decrease in a cost function associated with the cost value gradient represented by Eq. 5, or in other words, maximize $\log L(H+\lambda_t h_t)$.

At step 116, the selected weak classifier is added to the classification function. The selected weak classifier is added to the classification function, which will thereby be used to train any remaining weak classifiers. The selected weak classifier represents the classifier that is most likely to strengthen the classification function to further train other weak classifiers.

If there are remaining weak classifiers to be trained, the method returns to step 108 and performs steps 108 through 116 iteratively to train the remaining weak classifiers.

If there are no remaining weak classifiers, the method proceeds to step 118. At step 118, the trained classification function including all trained weak classifiers is output. All of the selected weak classifiers are added to the classification function for the landmark detector to use in order to accurately detect landmarks.

At step 120, a landmark in an input image may be detected using the trained classification function. The input image may be derived from a 3D volume. The 3D volume can be a C-arm CT volume, computed tomography (CT) volume, magnetic resonance imaging (MRI) volume, etc. The 3D volume can be received from an image acquisition device, such as a C-arm image acquisition system, or can be a previously stored volume loaded from memory or storage of a computer system, or some other computer readable medium.

Experiments were conducted by the present invention using noisy annotations and also clean annotations. 400 CT 3D volumes annotated by experts were collected. The annotations identified two landmarks: the tracheal bifurcation and the left lung apex. The tracheal bifurcation landmark is represented by landmark 202 in FIGS. 2a through 2d, and the left lung apex landmark is represented by landmark 204 in FIGS. 2a through 2d. 100 of the 400 CT 3D volumes were selected for testing and 300 were selected for training. Out of the 300 CT 3D volumes selected as training volumes, 200 training volumes were randomly selected to generate noisy annotations by perturbing the ground truth positions of the landmarks uniformly within a range of −16 to 16 mm in each dimension. During learning, the width of the positive bag neighborhood was set as 60 cubic mm, centered at a noisy annotation. This setting simulates a quality control where annotation errors should be less than +/−30 mm in each dimension.

Figure 3B:
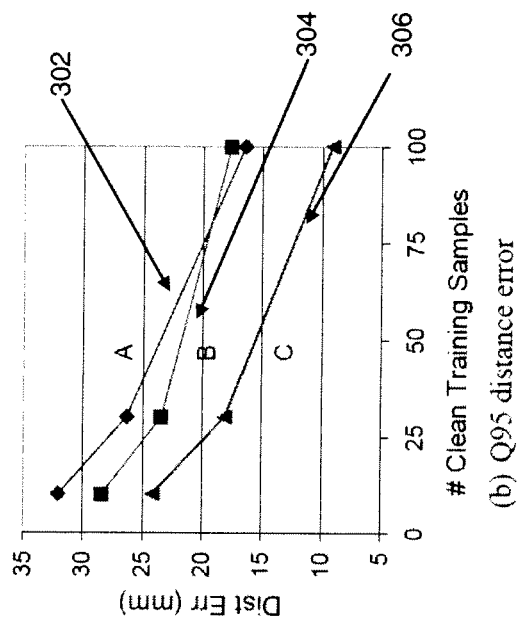
FIG. 3 show experimental results comparing conventional multiple instance learning and boosting algorithms with methods for training a landmark detector according to embodiments of the present invention.
Figure 3A:
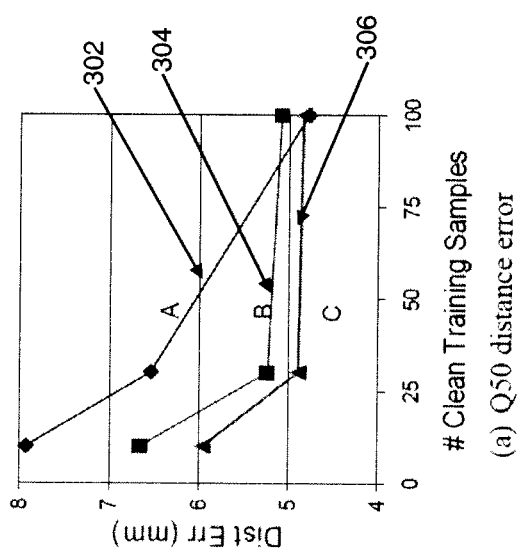

The method described herein corresponding to FIG. 1 was compared with conventional multiple instance learning and boosting algorithms such as MILBoost and AdaBoost. FIGS. 3a and 3b show the results when 200 noisy annotations and a varying number of clean (un-perturbed) annotations are used for training a tracheal bifurcation detector using AdaBoost, MILBoost, and the method described herein. AdaBoost results are represented by 302, MILBoost results are represented by 304, and results of the method described herein corresponding to FIG. 1 is represented by 306. The Q50 and Q95 distance errors shown in FIGS. 3a and 3b, respectively, refer to the 50 percentile (median) and 95 percentile of volumes sorted in ascending order by distance error. The 95-percentile distance error graph provides a measure of robustness. Given a small number of clean annotations, the method described herein corresponding to FIG. 1 has a smaller error rate than MILBoost and AdaBoost. Additionally, the method described herein corresponding to FIG. 1 only needs 30 clean annotations to achieve roughly the same performance as AdaBoost, which uses 100 clean annotations. Discarding the noisy annotations does not yield better results in any of the algorithms tested, which means that noisy annotations provide useful information for training detectors.

The distance error for each volume is the distance between the ground truth and the mean position of the N-highest-scored instances. Different algorithms have different N values, which yield the smallest error. Thus, each algorithm has its own optimal detector threshold.

Figure 4:
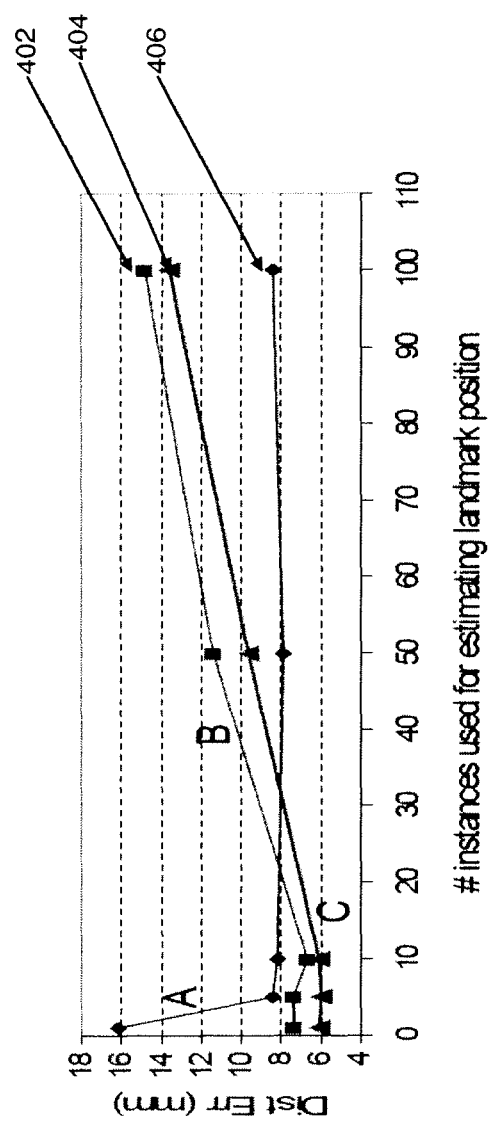
FIG. 4 shows a plot of distance errors when using different multiple instance learning algorithms, including methods for training a landmark detector according to embodiments of the present invention.

FIG. 4 shows the distance error when using AdaBoost, MILBoost, and the method described herein when the number of clean annotations is fixed at 10 and the number of noisy annotations is fixed at 200 with an adjusted detector threshold. AdaBoost results are represented by 402, MILBoost results are represented by 404, and results of the method described herein corresponding to FIG. 1 is represented by 406. From FIG. 4, it is shown that the method described herein requires a smaller number of highest-scored instances to estimate landmark position, requiring N=5 to reach a smallest error, whereas Adaboost requires N=50 to reach its smallest error. This suggests that the top-scored instances in the method described herein corresponding to FIG. 1 are closer to the ground truth position when compared to AdaBoost and MILBoost.

FIGS. 5a and 5b show true positive versus false positive ratios at various N or equivalently, various detector thresholds. FIG. 5a displays results for a tracheal bifurcation detector and FIG. 5b displays results for a left lung apex detector. The individual positions of the top N instances at various values of N are recorded, and for Each N, the number of instances that are over 2.5 voxels away from the ground truth position are counted. These instances are labeled false positives. AdaBoost results are represented by 502, MILBoost results are represented by 504, and results of the method described herein corresponding to FIG. 1 are represented by 506. From FIGS. 5a and 5b, it is shown that the method described herein has the highest true positive versus false positive ration for various N. This means that the top-scored instances are closer to the ground truth compared with AdaBoost and MILBoost. $C_{BAG}$ and $C_{INST}$, represented by 508 and 510, respectively, show the results of using bag-level and instance-level spatial context information independently. Combining the two spatial context information at both the bag-level and instance-level (results shown by 506) provides the best results.

Figure 6C:
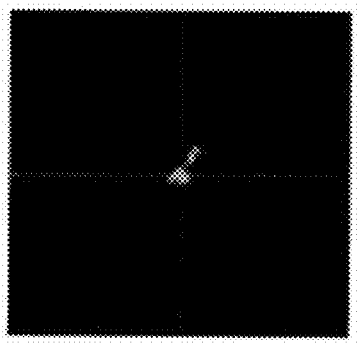
FIG. 6 depicts a visualization of detection results on test data based on experiments conducted using the present invention.
Figure 6B:
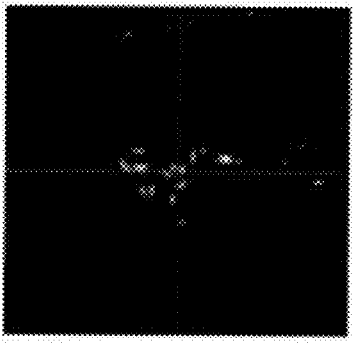
Figure 6A:
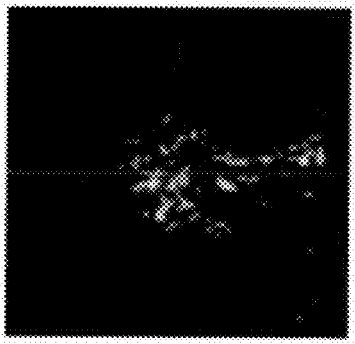

FIGS. 6a-6c each depict a visualization of detection results on test data. FIG. 6a shows an instance score map for a tracheal bifurcation detector using AdaBoost. FIG. 6b shows an instance score map for a tracheal bifurcation detector using MILBoost. FIG. 6c shows an instance score map for a tracheal bifurcation detector using the method described herein corresponding to FIG. 1. From FIG. 6c, it can be seen that the detector responses for the method described herein corresponding to FIG. 1 are highly concentrated at the ground truth position, while the detector responses of FIG. 6a and FIG. 6b are more scattered.

Figure 7:
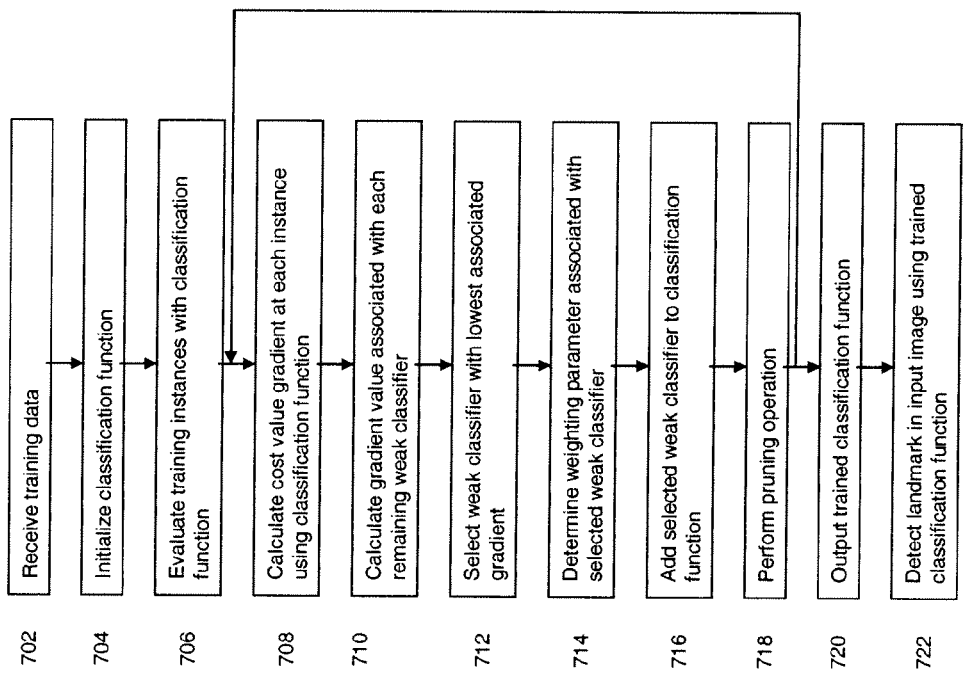
FIG. 7 illustrates yet another method for training a landmark detector according to an embodiment of the present invention.

FIG. 7 illustrates yet another method for training a landmark detector according to an embodiment of the present invention. At step 702, a plurality of annotated training data is received. The plurality of annotated training data includes a plurality of positive bags, each including a plurality of positively annotated instances, and a plurality of negative bags, each including at least one negatively annotated instance.

By letting n be the number of training bags with corresponding labels $l_i$, i-1, . . . , n, each bag i comprises $n_i$ instances to be used for training:

$$\{x_i^1, \ldots, x_i^{n_i}\}.$$

A score assigned to each instance is represented by:

$$f(x_i^j) = y_i^j = \sum_{t=1}^{T} \lambda_t h_t(x_i^j) \qquad \text{(Eq. 13)}$$

where $h_t$ represents a weak classifier, $\lambda_t \in R$ denotes a weighting parameter associated with each weak classifier, and T represents the number of weak classifiers.

At step 704, a classification function is initialized by training a first weak classifier based on the positive training bags and the negative training bags. The classification trains the first weak classifier by assigning a score to each of the training bags, which yields a probability representing whether or not a particular training bag is positive.

At step 706, all training instances are evaluated using the classification function. At this point, the classification function includes the first weak classifier and all of the training instances are evaluated based on the trained first weak classifier.

If there is more than one base classifier, or weak classifier to train, and so long as there remain weak classifiers to train, the method proceeds to step 708 to train each of the weak classifiers iteratively. For each of a plurality of remaining weak classifiers, each weak classifier will be trained by taking into account spatial context information of the training bags and the instances in each of the training bags. The implementation of spatial context information is discussed in greater detail below. After training of the first weak classifier in accordance with the steps set forth above, each of the remaining weak classifiers is trained.

At step 708, a cost value gradient is calculated for each instance in each positive training bag evaluated by the classification function based on spatial context information. The cost value gradient includes a data term and a spatial regularization term. The spatial regularization term is used for exploiting the spatial relationships of instances in positive bags. Both the data term and the spatial regularization term are discussed in further detail below. The cost value gradients are represented by the following equation:

$$\nabla C(f)(x_i^j) = \nabla D(f)(x_i^j) + \lambda \nabla R(f)(x_i^j) \qquad \text{(Eq. 14)}$$

for $$f = \sum_{k=1}^{t-1} \lambda_k h_k.$$

At step 710, a gradient value associated with each weak classifier is calculated based on the cost value gradients. These gradient values are used to determine which weak classifier will be the next one to be added to the classification function.

At step 712, a weak classifier having a lowest associated gradient value of the plurality of remaining weak classifiers is selected. The selected weak classifier is the weak classifier that has the lowest associated gradient value. Selecting the weak classifier is based on weights incorporating spatial context information into the associated gradient value. A detailed discussion of how the spatial context information is implemented is discussed below. The gradient associated with the weak classifiers from which the best weak classifier is selected is represented by:

$$\sum_{i=1}^{n} \sum_{j=1}^{n_i} \nabla C(f)(x_i^j) h_t(x_i^j) \qquad \text{(Eq. 15)}$$

The cost value gradient is associated with a cost function that is minimized to determine the best weak classifier. In an embodiment, the cost function includes a data term D and a regularization term R. Thus, the total cost is represented by:

$$C(f) = D(f) + \lambda R(f) \qquad \text{(Eq. 16)}$$

where $\lambda \geq 0$ is the weight parameter that denotes how much regularization to apply to the results. Boosting is performed on each weak classifier by computing gradients of the cost function to arrive at a cost value gradient.

With regard to the data term D(f), scores $y_i$ are assigned to each instance and the following data term cost is computed:

$$D(f) = \sum_{i=1}^{n} \frac{\exp(-l_i y_i)}{N_{l_i}} \qquad \text{(Eq. 17)}$$

where, $N_{-1} = \#\{i | 1 \leq i \leq n, l_i = -1\}$ represents the number of negative bags and $N_{+1} = \#\{i | 1 \leq i \leq n, l_i = +1\}$ represents the number of positive bags. By normalization, negative bags and positive bags contribute equally to the cost function.

In the method described herein, the cost function must be modified only for positive bags. The goal is to assign a score $y_i$ to the entire positive bag and penalize a low score by adding $\exp(-y_i)$ to the cost function. Ideally, $y_i = \max_{j=1, \ldots, n_i} y_i^j$. Since the max function is not differentiable, a smoothed max function with smoothing parameter k can be used instead. This smoothed max function is represented by:

$$y_i = \frac{1}{k} \log\left(\sum_{j=1}^{n_i} \exp(k y_i^j)\right) \quad \text{(Eq. 18)}$$

The function shown by Eq. 16 approaches the max function as parameter k approaches infinity and is differentiable for all k>0. Thus, the overall data term for the cost function may be represented by:

$$D(f) = \sum_{i=1}^{n} \frac{\exp\left(\frac{-l_i}{k}\log\left(\sum_{j=1}^{n_i} \exp(k y_i^j)\right)\right)}{N_{l_i}} \quad \text{(Eq. 19)}$$

The gradient for each instance in each training bag i is represented as follows:

$$\nabla D(f)(x_i^j) = \frac{-l_i \exp(-l_i y_i)}{N_{l_i}} \left(\frac{\exp(k y_i^j)}{\sum_{h=1}^{n_i} \exp(k y_n^h)}\right) \quad \text{(Eq. 20)}$$

The formulation shown by Eq. 18 achieves two goals: A positive bag will have a high score when exactly one of its instances has a high score and a low score only when every instance within the bag has a low score. If the probability for a bag i is represented as:

$$p_i = \frac{\sum_{j=1}^{n_i} \exp(y_i^j)}{1 + \sum_{j=1}^{n_i} \exp(y_i^j)} \quad \text{(Eq. 21)}$$

The probability represented by Eq. 19 is equal to:

$$\sigma(y_i) = \frac{1}{1 + \exp(-y_i)} \quad \text{(Eq. 22)}$$

where $y_i$ is the score of bag i computed with the smoothed max function with smoothing parameter k=1 and $\sigma(\cdot)$ is the logistic function.

By using the smoothed max function with a high enough smoothing parameter k, the data term will not favor or penalize any specific distribution of scores inside a positive bag, except for favoring bags with at least one high score.

With regard to the regularization term R(f) can be represented by a Total Variation (TV) regularization:

$$R = \sum_{i=1}^{n} \frac{\sum_{j=1}^{n_i} \|\nabla y_i^j\|}{n_i} \quad \text{(Eq. 23)}$$

where $\|\nabla y_i^j\|$ is the norm of the discrete gradient. If the annotated training data includes either 2D images or 3D volumes, positive bags will most likely have a grid structure. For 2D images, the gradient is represented by:

$$\nabla y_i^j = (y_i^{j\text{right}} - y_i^j, y_i^{j\text{lower}} - y_i^j)^T \quad \text{(Eq. 24)}$$

where $j_{right}$ is the index of instances on the right-hand side of $x_i^j$ and $j_{lower}$ is the index of the instances just below $x_i^j$.

The TV regularization allows for sharp peaks in score maps and favors spatially connected subsets of instances to which high scores are assigned. Subsets with a low perimeter are favored. This is explained by the coarea formula:

$$\int \Omega \|\nabla y\| dx = \int_{-\infty}^{\infty} P(\{y > t\}, \Omega) dt \quad \text{(Eq. 24)}$$

where $P(\{y>t\},\Omega)$ is the perimeter of the level set $\{x \in \Omega | y(x) > t\}$ in the set $\Omega$. A detector that implements the aforementioned TV regularization will output scores whose level sets have a low perimeter.

Figure 8:
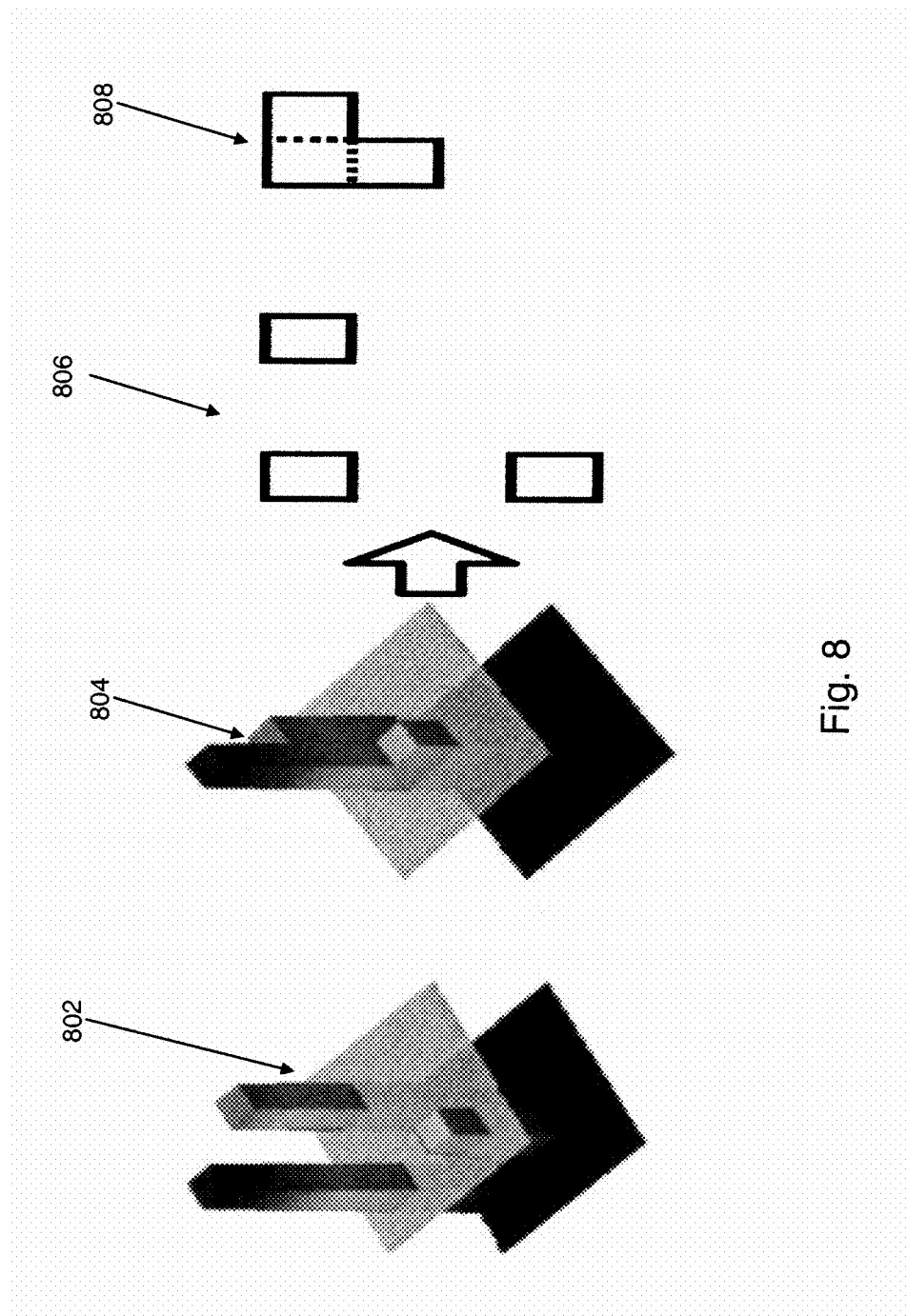
FIG. 8 depicts perimeter levels of two level sets from two score maps, in accordance with an embodiment of the present invention.

FIG. 8 depicts the perimeter level of two level sets from two score maps. The two score maps shown in FIG. 8 are score map 802 with corresponding level set 806, and score map 804 with corresponding level set 808. Level set 806 has a perimeter of 12 units, while level set 808 has a perimeter of 8. Thus, level set 808 has a lower TV regularization value.

The TV regularization described above is not differentiable, but is convex. Sub-gradients or a smooth approximation may be used to achieve the regularization. Smooth approximation may be achieved by replacing the norm $\|\nabla y_i^j\|$ with $$\sqrt{\sum_{k=1}^{d}(\nabla y_i^j)_k^2 + \varepsilon}$$

where $\varepsilon > 0$ is a constant and d is the dimension. The regularization is then smooth for points with zero gradients. The gradient for an each instance in a bag, arising from the smoothed regularization term is represented by:

$$\nabla R(f)(x_i^j) = -\text{div}\left(\frac{\nabla y_i^j}{n_i \cdot \sqrt{\sum_{k=1}^{d}(\nabla y_i^j)_k^2 + \varepsilon}}\right) \quad \text{(Eq. 26)}$$

Other regularizations are also possible. For example:

$$R = \lambda \sum_{i=1}^{n} \sum_{j=1}^{n_i} \|\nabla y_i^j\|^2 \quad \text{(Eq. 27)}$$

Using Eq. 27 results in a regularization that ensures that a classifier does not vary strongly. This is desirable when there are bags where neighboring probabilities should be similar.

At step 714, a weighting parameter associated with the selected weak classifier is determined. The weighing parameter is determined using a line search to achieve a decrease in a cost function associated with the cost value gradient.

At step 716, the selected weak classifier is added to the classification function. The selected weak classifier is added to the classification function, which will thereby be used to train any remaining weak classifiers. The selected weak classifier represents the classifier that is most likely to strengthen the classification function to further train other weak classifiers.

At step 718, a pruning operation may be applied in order to lessen the computational load when training each weak classifier. The pruning operation computes scores for all negative instances using the trained weak classifiers, performs weight trimming of the negative instances in the training bags, and includes negative bags with high scores from all training instances to replace the trimmed negative instances. In order to lessen computational load, rejection thresholds must be set to reject false negatives early in the process. For example, if there is an instance x requiring classification, and rejection thresholds $\theta(t)$ for $t \in R \subset N$, if $t \in R$, $t<T$ and $$\sum_{l=1}^{t} \lambda_l h_l(x) < \theta(t),$$

then instance x may be rejected without evaluating the remaining T−t weak classifiers.

Using the following rejection threshold allows for retaining at least one instance in each positive bag:

$$\theta(t) = \min_{\{1 \le i \le n_i, l_i = 1\}} \left[ \max_{\{1 \le j \le n_i\}} \sum_{s=1}^{t} \lambda_s h_s(x_i^j) \right] \quad \text{(Eq. 28)}$$

If there are remaining weak classifiers to be trained, the method returns to step 708 and performs steps 708 through 718 iteratively to train the remaining weak classifiers.

If there are no remaining weak classifiers, the method proceeds to step 720. At step 720, the trained classification function including all trained weak classifiers is output. All of the selected weak classifiers are added to the classification function for the landmark detector to use in order to accurately detect landmarks.

At step 722, a landmark in an input image may be detected using the trained classification function. The input image may be derived from a 3D volume. The 3D volume can be a C-arm CT volume, computed tomography (CT) volume, magnetic resonance imaging (MRI) volume, etc. The 3D volume can be received from an image acquisition device, such as a C-arm image acquisition system, or can be a previously stored volume loaded from memory or storage of a computer system, or some other computer readable medium.

Experiments were conducted using the method described herein corresponding to FIG. 7, to train a landmark detector to detect the tracheal bifurcation. A training dataset including 80 training bags with one instance (each instance being an exact or clean annotation from an expert) and 194 training bags with 1000 instances each (one of which denotes the true position of the tracheal bifurcation, the one instance being unknown). Each weak classifier is represented by histograms over rectangle features. Negative instances are sampled from the training dataset at all positions different from the locations of instances in the positive bags. An instance is considered positive if it is less than or equal to 2.5 mm away from the exact object location. For comparison, MILBoost with no spatial regularization was used to train the dataset, and the results were compared to the method described herein corresponding to FIG. 7 using spatial regularization.

Figure 9:
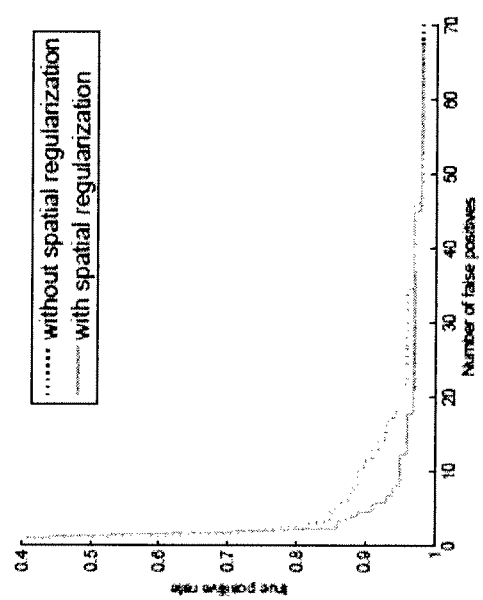
FIG. 9 depicts receiver operating characteristic curves showing true positive rate and false positives for detecting a tracheal bifurcation, in accordance with an embodiment of the present invention.

FIG. 9 depicts receiver operating characteristic (ROC) curves showing the true positive rate and number of false positives using MILBoost and using the method described herein corresponding to FIG. 7. From the ROC curves, it is evident that the method described herein corresponding to FIG. 7 implementing spatial regularization shows significant improvements in detecting the tracheal bifurcation.

A second experiment was performed on an inherently ambiguous dataset, which in this experiment was training a landmark detector to detect the liver top. In general, it is difficult to detect the liver top since the upper side of the liver is flat, making it difficult to properly annotate. For training, 100 training bags with one accurate annotation each, and 200 positive bags with 1000 examples inside each bag were used.

Figure 10:
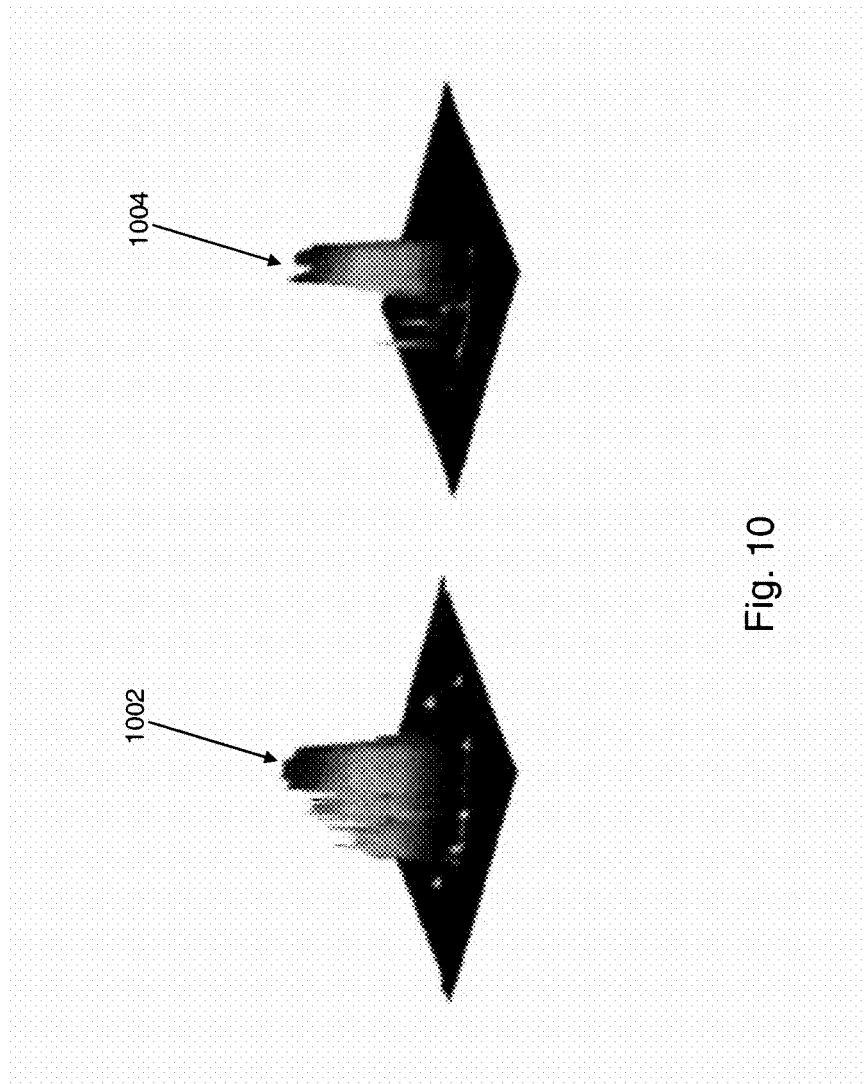
FIG. 10 depicts two score maps comparing MILBoost and the methods for training a landmark detector according to embodiments of the present invention.

FIG. 10 depicts two score maps, one score map from implementing MILBoost with no spatial regularization and the other score map from implementing the method described herein corresponding to FIG. 7. Score map 902 represents the score map resulting from a classifier trained using MILBoost and score map 904 represents the score map resulting from a classifier trained using the method described herein corresponding to FIG. 7. The influence of spatial regularization is apparent from score map 904, which exhibits a tighter cluster of high scores compared to score map 902, which does not use spatial regularization.

Figure 11:
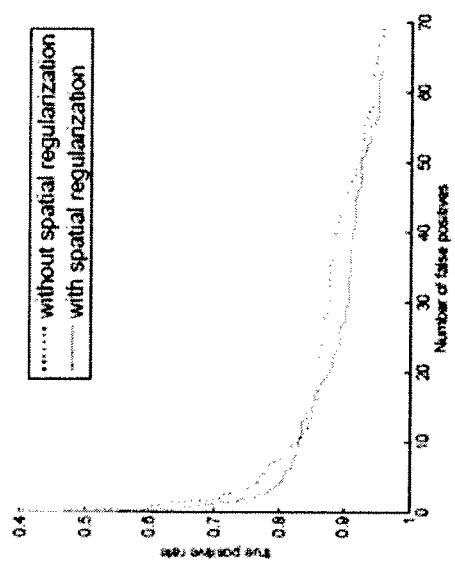
FIG. 11 depicts receiver operating characteristic curves showing true positive rate and false positives for detecting a liver top, in accordance with an embodiment of the present invention.

FIG. 11 depicts receiver operating characteristic (ROC) curves showing the true positive rate and number of false positives using MILBoost and using the method described herein corresponding to FIG. 7. From the ROC curves, it is evident that the method described herein corresponding to FIG. 7 implementing spatial regularization shows significant improvements in detecting the liver top.

Figure 12:
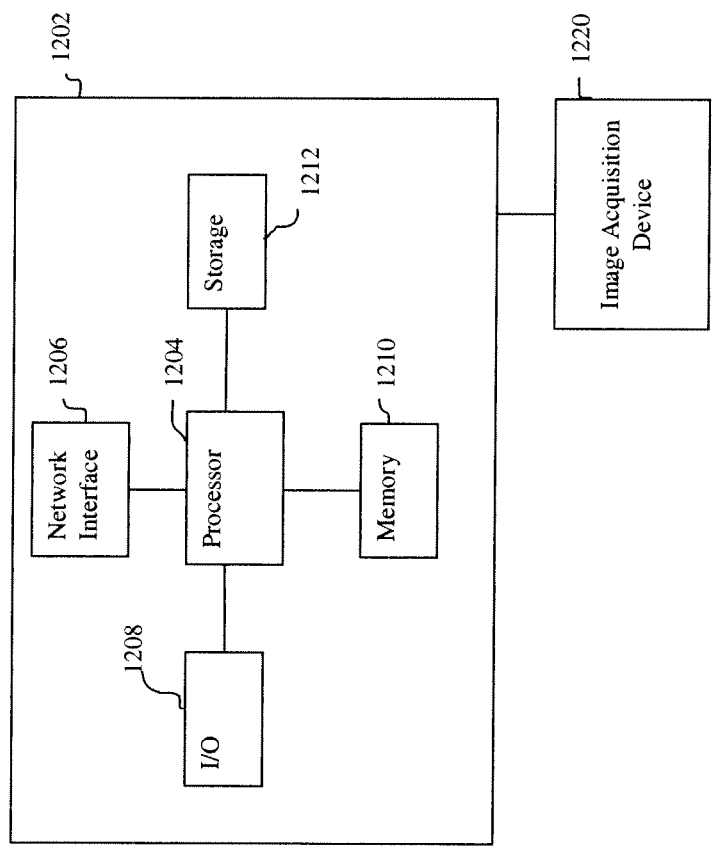
FIG. 12 is a high-level block diagram of a computer capable of implementing the present invention.

The above-described methods for training landmark detectors may be implemented on a computer using well-known computer processors, memory units, storage devices, computer software, and other components. A high-level block diagram of such a computer is illustrated in FIG. 12. Computer 1202 contains a processor 1204, which controls the overall operation of the computer 1202 by executing computer program instructions, which define such operation. The computer program instructions may be stored in a storage device 1212, or other computer readable medium (e.g., magnetic disk, CD ROM, etc.) and loaded into memory 1210 when execution of the computer program instructions is desired. Thus, the steps of the methods of FIGS. 1 and 7 may be defined by the computer program instructions stored in the memory 1210 and/or storage 1212 and controlled by the processor 1204 executing the computer program instructions. An image acquisition device 1220 can be connected to the computer 1202 to input images to the computer 1202. It is possible to implement the image acquisition device 1220 and the computer 1202 as one device. It is also possible that the image acquisition device 1220 and the computer 1202 communicate wirelessly through a network. The computer 1202 also includes one or more network interfaces 1206 for communicating with other devices via a network. The computer 1202 also includes other input/output devices 1208 that enable user interaction with the computer 1202 (e.g., display, keyboard, mouse, speakers, buttons, etc.). One skilled in the art will recognize that an implementation of an actual computer could contain other components as well, and that FIG. 12 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method for training a landmark detector, comprising:
   receiving training data including a plurality of training bags including: a plurality of positive training bags, each including a plurality of positively annotated instances; and a plurality of negative training bags, each including at least one negatively annotated instance;
   initializing a classification function by training a first weak classifier based on the positive training bags and the negative training bags;
   evaluating all training instances using the classification function;
   for each of a plurality of remaining weak classifiers:
   calculating a cost value gradient based only on spatial context information of each instance in each positive training bag evaluated by the classification function, wherein calculating the cost value gradient comprises calculating the spatial context information at a training bag level by determining a spread of each training bag;
   calculating a gradient value associated with each weak classifier based on the cost value gradients;
   selecting a weak classifier of the plurality of remaining weak classifiers having a lowest associated gradient value;
   determining a weighting parameter associated with the selected weak classifier; and
   adding the selected weak classifier to the classification function.

2. The method of claim 1, further comprising:
   training a second weak classifier of the plurality of weak classifiers using the spatial context information;
   iteratively training the remaining plurality of weak classifiers until all of the plurality of weak classifiers are trained; and
   outputting the classification function.

3. The method of claim 1, wherein determining a spread of each training bag comprises:
   normalizing a score of each training bag against a number of instances in the respective training bag.

4. The method of claim 1, wherein calculating a cost value gradient based only on spatial context information of each instance in each positive training bag evaluated by the classification function comprises:
   calculating the spatial context information at an instance level by using a rank conditioned rank selection filter on each training bag.

5. The method of claim 4, wherein calculating the cost value gradient based on spatial context information of each instance in each positive training bag evaluated by the classification function further comprises:
   combining the calculated spatial context information at the training bag level and the calculated spatial context information at the instance level.

6. The method of claim 1, wherein determining a weighting parameter comprises:
   performing a line search to achieve a decrease in a cost function associated with the cost value gradient.

7. The method of claim 1, wherein training a first weak classifier of a plurality of weak classifiers using spatial context information further comprises:
   performing a pruning operation.

8. The method of claim 7, wherein performing the pruning operation comprises:
   computing scores for all negative instances using the classification function;
   performing weight trimming on the negative instances; and
   including negative bags with high scores in order to replace trimmed negative instances.

9. A method for training a landmark detector, comprising:
   receiving training data including a plurality of training bags including: a plurality of positive training bags, each including a plurality of positively annotated instances; and a plurality of negative training bags, each including at least one negatively annotated instance;
   initializing a classification function by training a first weak classifier based on the positive training bags and the negative training bags;
   evaluating all training instances using the classification function;
   for each of a plurality of remaining weak classifiers:
   calculating a cost value gradient based only on spatial context information of each instance in each positive training bag evaluated by the classification function, wherein calculating the cost value gradient comprises:
   calculating a data term;
   calculating a spatial regularization term; and
   calculating the cost value gradient using the data term and the spatial regularization term;
   calculating a gradient value associated with each weak classifier based on the cost value gradients;
   selecting a weak classifier of the plurality of remaining weak classifiers having a lowest associated gradient value;
   determining a weighting parameter associated with the selected weak classifier; and
   adding the selected weak classifier to the classification function.

10. The method of claim 9, wherein calculating the data term comprises:
    calculating the data term using a smoothed max function.

11. The method of claim 9, wherein calculating a spatial regularization term comprises:
    calculating a total variation regularization value for each training bag.

12. The method of claim 11, wherein calculating a total variation regularization value for each training bag comprises:
    determining a perimeter of a score map of each training bag.

13. An apparatus for training a landmark detector, comprising:
    means for receiving training data including a plurality of training bags including: a plurality of positive training bags, each including a plurality of positively annotated instances; and a plurality of negative training bags, each including at least one negatively annotated instance;

means for initializing a classification function by training a first weak classifier based on the positive training bags and the negative training bags;

means for evaluating all training instances using the classification function;

means for calculating a cost value gradient based only on spatial context information of each instance in each positive training bag evaluated by the classification function, wherein the means for calculating the cost value comprises means for calculating the spatial context information at a training bag level by determining a spread of each training bag;

means for calculating a gradient value associated with each weak classifier based on the cost value gradients;

means for selecting a weak classifier of the plurality of remaining weak classifiers having a lowest associated gradient value;

means for determining a weighting parameter associated with the selected weak classifier; and means for adding the selected weak classifier to the classification function.

14. The apparatus of claim 13, further comprising:
means for training a second weak classifier of the plurality of weak classifiers using spatial context information;
means for iteratively training the remaining plurality of weak classifiers until all of the plurality of weak classifiers are trained; and
means for outputting the classification function.

15. The apparatus of claim 13, wherein means for determining a spread of each training bag comprises:
means for normalizing a score of each training bag against a number of instances in the respective training bag.

16. The apparatus of claim 13, wherein means for calculating a cost value gradient based only on spatial context information of each instance in each positive training bag evaluated by the classification function comprises:
means for calculating the spatial context information at an instance level by using a rank conditioned rank selection filter on each training bag.

17. The apparatus of claim 16, wherein the means for calculating the cost value gradient based only on spatial context information of each instance in each positive training bag evaluated by the classification function further comprises:
means for combining the calculated spatial context information at the training bag level and the spatial calculated spatial context information at the instance level.

18. The apparatus of claim 13, wherein means for determining a weighting parameter comprises:
means for performing a line search to achieve a decrease in a cost function associated with the cost value gradient.

19. The apparatus of claim 13, wherein means for training a first weak classifier of a plurality of weak classifiers using spatial context information further comprises:
means for performing a pruning operation.

20. The apparatus of claim 19, wherein means for performing the pruning operation comprises:
means for computing scores for all negative instances using the classification function;
means for performing weight trimming on the negative instances; and
means for including negative bags with high scores in order to replace trimmed negative instances.

21. An apparatus for training a landmark detector, comprising:
means for receiving training data including a plurality of training bags including: a plurality of positive training bags, each including a plurality of positively annotated instances; and a plurality of negative training bags, each including at least one negatively annotated instance;
means for initializing a classification function by training a first weak classifier based on the positive training bags and the negative training bags;
means for evaluating all training instances using the classification function;
means for calculating a cost value gradient based only on spatial context information of each instance in each positive training bag evaluated by the classification function, wherein the means for calculating the cost value gradient comprises:
means for calculating a data term;
means for calculating a spatial regularization term; and
means for calculating the cost value gradient using the data term and the spatial regularization term;
means for calculating a gradient value associated with each weak classifier based on the cost value gradients;
means for selecting a weak classifier of the plurality of remaining weak classifiers having a lowest associated gradient value;
means for determining a weighting parameter associated with the selected weak classifier; and
means for adding the selected weak classifier to the classification function.

22. The apparatus of claim 21, wherein means for calculating the data term comprises:
means for calculating the data term using a smoothed max function.

23. The apparatus of claim 21, wherein means for calculating a spatial regularization term comprises:
means for calculating a total variation regularization value for each training bag.

24. The apparatus of claim 23, wherein means for calculating a total variation regularization value for each training bag comprises:
means for determining a perimeter of a score map of each training bag.

25. A non-transitory computer readable medium encoded with computer executable instructions for training a landmark detector, the computer executable instructions defining steps comprising:
receiving training data including a plurality of training bags including: a plurality of positive training bags, each including a plurality of positively annotated instances; and a plurality of negative training bags, each including at least one negatively annotated instance;
initializing a classification function by training a first weak classifier based on the positive training bags and the negative training bags;
evaluating all training instances using the classification function;
for each of a plurality of remaining weak classifiers:
calculating a cost value gradient based only on spatial context information of each instance in each positive training bag evaluated by the classification function, wherein calculating the cost value comprises calculating the spatial context information at a training bag level by determining a spread of each training bag;
calculating a gradient value associated with each weak classifier based on the cost value gradients;
selecting a weak classifier of the plurality of remaining weak classifiers having a lowest associated gradient value;

determining a weighting parameter associated with the selected weak classifier; and adding the selected weak classifier to the classification function.

26. The computer readable medium of claim 25, further comprising computer executable instructions defining the steps of:

training a second weak classifier of the plurality of weak classifiers using the spatial context information;

iteratively training the remaining plurality of weak classifiers until all of the plurality of weak classifiers are trained; and outputting the classification function.

27. The computer readable medium of claim 25, wherein the computer executable instructions defining the step of determining a spread of each training bag comprises computer executable instructions defining the step of:

normalizing a score of each training bag against a number of instances in the respective training bag.

28. The computer readable medium of claim 25, wherein the computer executable instructions defining the step of calculating a cost value gradient based only on spatial context information of each instance in each positive training bag evaluated by the classification function comprises computer executable instructions defining the step of:

calculating the spatial context information at an instance level by using a rank conditioned rank selection filter on each training bag.

29. The computer readable medium of claim 28, wherein the computer executable instructions defining the step of calculating the cost value gradient at based on spatial context information of each instance in each positive training bag evaluated by the classification function comprises computer executable instructions defining the steps of:

combining the calculated spatial context information at the training bag level and the spatial calculated spatial context information at the instance level.

30. The computer readable medium of claim 25, wherein the computer executable instructions defining the step of determining a weighting parameter comprises computer executable instructions defining the step of:

performing a line search to achieve a decrease in a cost function associated with the cost value gradient.

31. The computer readable medium of claim 25, wherein the computer executable instructions defining the step of training a first weak classifier of a plurality of weak classifiers using spatial context information further comprises computer executable instructions defining the step of:

performing a pruning operation.

32. The computer readable medium of claim 31, wherein the computer executable instructions defining the step of performing the pruning operation comprises computer executable instructions defining the steps of:

computing scores for all negative instances using the classification function;

performing weight trimming on the negative instances; and including negative bags with high scores in order to replace trimmed negative instances.

33. A non-transitory computer readable medium encoded with computer executable instructions for training a landmark detector, the computer executable instructions defining steps comprising:

receiving training data including a plurality of training bags including: a plurality of positive training bags, each including a plurality of positively annotated instances; and a plurality of negative training bags, each including at least one negatively annotated instance;

initializing a classification function by training a first weak classifier based on the positive training bags and the negative training bags;

evaluating all training instances using the classification function;

for each of a plurality of remaining weak classifiers:

calculating a cost value gradient based only on spatial context information of each instance in each positive training bag evaluated by the classification function, wherein the computer executable instructions defining the step of calculating the cost value gradient further comprise computer executable instructions defining the steps of:

calculating a data term;

calculating a spatial regularization term; and calculating the cost value gradient using the data term and the spatial regularization term;

calculating a gradient value associated with each weak classifier based on the cost value gradients;

selecting a weak classifier of the plurality of remaining weak classifiers having a lowest associated gradient value;

determining a weighting parameter associated with the selected weak classifier; and adding the selected weak classifier to the classification function.

34. The computer readable medium of claim 33, wherein the computer executable instructions defining the step of calculating the data term comprises computer executable instructions defining the step of:

calculating the data term using a smoothed max function.

35. The computer readable medium of claim 33, wherein the computer executable instructions defining the step of calculating a spatial regularization term comprises computer executable instructions defining the step of:

calculating a total variation regularization value for each training bag.

36. The computer readable medium of claim 35, wherein the computer executable instructions defining the step of calculating a total variation regularization value for each training bag comprises computer executable instructions defining the step of:

determining a perimeter of a score map of each training bag.

* * * * *